US009703663B2

(12) United States Patent
Cai et al.

(10) Patent No.: US 9,703,663 B2
(45) Date of Patent: Jul. 11, 2017

(54) REMINDING APPARATUS IN DATA PROCESSING DEVICE, REMINDING METHOD AND STORAGE MEDIUM

(71) Applicant: TENCENT TECHNOLOGY (SHENZHEN) COMPANY LIMITED, Shenzhen (CN)

(72) Inventors: Yang Cai, Shenzhen (CN); Xin Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/673,105

(22) Filed: Mar. 30, 2015

(65) Prior Publication Data

US 2015/0212918 A1 Jul. 30, 2015

Related U.S. Application Data

(63) Continuation of application No. PCT/CN2013/083474, filed on Sep. 13, 2013.

(30) Foreign Application Priority Data

Sep. 29, 2012 (CN) .......................... 2012 1 0370673

(51) Int. Cl.
*G06F 3/00* (2006.01)
*G06F 9/44* (2006.01)
(Continued)

(52) U.S. Cl.
CPC .............. *G06F 11/324* (2013.01); *G06F 9/44* (2013.01); *G06F 9/4443* (2013.01); *G06F 9/455* (2013.01);
(Continued)

(58) Field of Classification Search
CPC ...................................................... G06F 11/324
(Continued)

(56) References Cited

U.S. PATENT DOCUMENTS

2002/0116541 A1\* 8/2002 Parker ..................... G06F 15/02
719/318
2012/0260118 A1\* 10/2012 Jiang ..................... G06F 9/4843
713/340

FOREIGN PATENT DOCUMENTS

CN 1774104 A 5/2006
CN 101202555 A 6/2008
(Continued)

OTHER PUBLICATIONS

International Search Report issued Dec. 19, 2013 re: Application No. PCT/CN2013/083474; citing: CN 101783824 A, CN 101778173 A, CN 101202555 A and CN 1774104 A.
(Continued)

Primary Examiner — Timothy A Mudrick
(74) Attorney, Agent, or Firm — Cantor Colburn LLP

(57) ABSTRACT

A reminding apparatus includes: a reminding module, configured to determine reminding time of the reminding apparatus and a reminding event corresponding to the reminding time, and trigger the reminding event when the reminding time is up; a background miming module, configured to indicate an operation system of the data processing device to trigger the reminding apparatus to enter a background running state after detecting a switch instruction; a battery level checking module, configured to check battery level of the data processing device when the reminding apparatus runs in the background; and a battery level protecting module, configured to write a local notification into the operation system when the battery level is lower than a predefined threshold, set triggering time of the local notification as the reminding time, and trigger the reminding apparatus to enter
(Continued)

a pending state. The local notification can be triggered automatically by the operation system.

14 Claims, 5 Drawing Sheets

(51) Int. Cl.
*G06F 9/46* (2006.01)
*G06F 13/00* (2006.01)
*G06F 11/32* (2006.01)
*H04W 52/02* (2009.01)
*G06F 9/455* (2006.01)
*G06F 11/14* (2006.01)
*H04M 1/725* (2006.01)

(52) U.S. Cl.
CPC ..... *G06F 11/1441* (2013.01); *H04W 52/0251* (2013.01); *H04W 52/0277* (2013.01); *H04M 1/72566* (2013.01); *Y02B 60/50* (2013.01)

(58) Field of Classification Search
USPC .......................................................... 719/318
See application file for complete search history.

(56) References Cited

FOREIGN PATENT DOCUMENTS

| CN | 101778173 A | 7/2010 |
|---|---|---|
| CN | 101783824 A | 7/2010 |
| CN | 101909112 A | 12/2010 |

OTHER PUBLICATIONS

CN Office Action issued Mar. 1, 2017 re: Application No. 201210370673.7; pp. 1-7; citing: CN101909112A, US20020116541 and CN101202555A.

International Preliminary Report on Patentability issued Apr. 16, 2015 re: Application No. PCT/CN2013/083474; pp. 1-9, CN 101783824 A, CN 101778173 A and CN 101202555 A.

* cited by examiner

| Required background modes | Array | 1 Item |
|---|---|---|
| Item 0 | String | APP plays audio |

Fig. 5

REMINDING APPARATUS IN DATA PROCESSING DEVICE, REMINDING METHOD AND STORAGE MEDIUM

This application is a continuation of International Application No. PCT/CN2013/083474, filed on Sep. 13, 2013, which claims the benefit and priority of Chinese Patent Application No. 201210370673.7, entitled "Reminding Apparatus in Data Processing Device and Reminding Method" and filed on Sep. 29, 2012. The entire disclosures of each of the above applications are incorporated herein by reference.

TECHNICAL FIELD

The present disclosure relates to the technologies of data processing device, and more particularly to a reminding apparatus in a data processing device, a reminding method and a storage medium.

BACKGROUND

At present, data processing devices such as a computer, a smart mobile phone, a palm computer and a tablet computer are popular increasingly. Operation systems of the data processing devices have different characteristics. For example, a certain operation system may have special restriction on foreground and background operation abilities of an application apparatus running in a data processing device. The application apparatus may be referred to an Application (APP).

An APP runs in the foreground, which means that, in an operation system, the APP runs on a current interface and a user may operate the APP on the current interface. In many operation systems, such as iOS operation system, only one APP is allowed to run in the foreground at the same time.

An APP runs in the background, which means that, if the operation system detects an instruction of returning to a main interface or an instruction of switching to another interface when the APP runs in the foreground, the operation system switches the current interface to a target interface and still keeps the running state of the APP. At this time, a user is unable to see the interface of the APP running in the background. In an example, the instruction of returning to the main interface may be an operation of pressing a "home" key of the operation system of a handheld device.

Some operation systems such as the iOS operation system only allow some types of APPs to run in the background. For example, APPs for playing music, APPs for performing a Location Based Service (LBS) and APPs for performing a conversation in the operation system of mobile phone are allowed to run in the background. When such an APP runs in the background, operations corresponding to the APP should be performed. For example, in the background, the APPs for playing music should continue to play music, the APPs for performing a LBS should continue to perform location processing, and the APPs for performing a conversation should keep the conversation. When other types of APPs run in the foreground, if the operation system detects an instruction of returning to a main interface or an instruction of switching to another interface, the operation system pends the APPs, that is, pauses the running states of the APPs.

For some APPs that are not allowed to run in the background, users hope these APPs to run in the background to implement reminding functions. That is, reminding time may be set by a user or calculated by an APP according to the APP's logic. During a process that the APP runs in the background, the APP may trigger a reminding event when the reminding time is up, for example, play music or display reminding letters.

For example, an APP named "background alarm clock" has been developed. A user hopes the APP named "background alarm clock" to run in the background and play music or alarm at appointed time to implement a reminding function. Since the background running of APPs similar to the APP named "background alarm clock" is restricted in some operation systems such as iOS operation system, a solution is provided for these operation systems to implement the background reminding function of the APPs. The solution is implemented as follows. In the description file of an APP, the APP is marked as an APP type that is allowed to run in the background by the operation system. When the APP runs in the background, operations corresponding to the APP are performed. For example, the APP is marked as a music playing type, that is, the APP is disguised as an APP for playing music. Accordingly, the operation system may determine according to the description file that the type of the APP is the music playing type. When running in the background, the APP needs to play a quiet audio file circularly. In this way, the operation system will allow the APP to run in the background. If the APP stops playing the quiet audio file, the APP may be pended by the operation system. Since the APP named "background alarm clock" is allowed to run in the background, the APP may check whether predefined reminding time is up. When the predefined reminding time is up, an alarm clock event corresponding to the predefined reminding time may be triggered, for example, alarm or music is played, to implement the reminding function.

However, the solution has following disadvantages.

When an APP similar to the APP named "background alarm clock" runs in the background, the APP must perform some operations to make the operation system allow the APP to run in the background. For example, the APP needs to play a quiet audio file continuously, perform location processing continuously, or keep a conversation. However, these operations make battery consumption high, and thus it is possible that the battery of the device is used up before the reminding time is up. In this way, the reminding function of the APP cannot be implemented. For example, the reminding time of an alarm clock is set as 7 a.m. by a user. If the battery level of the device is low, it is possible that the battery of the device is used up before 7 a.m. At this time, the operation system has been automatically powered off, and thus the reminding function of the alarm clock cannot be implemented.

SUMMARY

Embodiments of the present disclosure provide a reminding apparatus in a data processing device, a reminding method and a storage medium, to trigger a reminding function in the background and protect the battery level of the data processing device.

The solution of the present disclosure is implemented as follows.

A reminding apparatus in a data processing device includes:

a reminding module, configured to determine reminding time of the reminding apparatus and a reminding event corresponding to the reminding time, and trigger the reminding event when the reminding time is up;

a background running module, configured to indicate an operation system of the data processing device to trigger the reminding apparatus to enter a background running state after detecting a switch instruction;

a battery level checking module, configured to check battery level of the data processing device when the reminding apparatus runs in the background; and a battery level protecting module, configured to write a local notification into the operation system when the battery level of the data processing device is lower than a predefined threshold, set triggering time of the local notification as the reminding time of the reminding apparatus, and trigger the reminding apparatus to enter a pending state, and the local notification can be triggered automatically by the operation system.

A reminding method of a reminding apparatus in a data processing device includes:

determining reminding time of the reminding apparatus and a reminding event corresponding to the reminding time, and triggering the reminding event when the reminding time is up;

indicating an operation system of the data processing device to trigger the reminding apparatus to enter a background running state after detecting a switch instruction;

checking battery level of the data processing device when the reminding apparatus runs in the background; and writing a local notification into the operation system when the battery level of the data processing device is lower than a predefined threshold, setting triggering time of the local notification as the reminding time of the reminding apparatus, and triggering the reminding apparatus to enter a pending state, and the local notification can be triggered automatically by the operation system.

A storage medium includes computer readable program codes, configured to perform the processes of the above method.

In the embodiments of the present disclosure, the reminding apparatus checks the battery level of the data processing device when the reminding apparatus runs in the background. When the battery level of the data processing device is lower than a predefined threshold, a local notification that can be triggered automatically by the operation system is written into the operation system. The triggering time of the local notification is set as the reminding time of the reminding apparatus. Afterwards, the reminding apparatus is triggered to enter a pending state. In this way, when the battery level of the data processing device is low, the reminding apparatus may be pended to protect the battery level. Further, the reminding apparatus hands the reminding operation over to the local notification of the operation system. When the reminding time is up, the reminding function may be implemented by the operation system. Accordingly, not only the reminding function can be triggered in the background, but also the battery level of the data processing device can be protected, thereby preventing the battery of the data processing device from being used up and further avoiding a problem that the reminding function cannot be implemented.

BRIEF DESCRIPTION OF THE DRAWINGS

FIG. 5 is a diagram illustrating an application configuration file of iOS operation system into which correlated parameters are added according to an embodiment of the present disclosure.

DETAILED DESCRIPTION

The solution of the present disclosure is illustrated hereinafter with reference to the accompanying drawings and embodiments.

Figure 1:
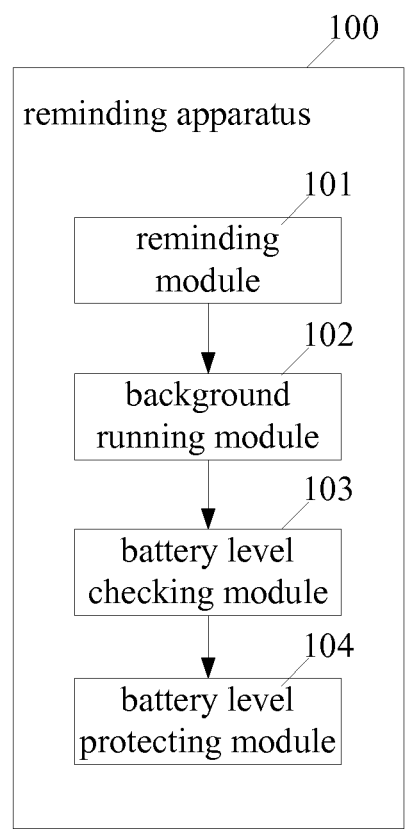
FIG. 1 is a diagram illustrating the structure of a reminding apparatus in a data processing device according to an embodiment of the present disclosure.

FIG. 1 is a diagram illustrating the structure of a reminding apparatus in a data processing device according to an embodiment of the present disclosure. The reminding apparatus may be an APP installed in the data processing device. Referring to FIG. 1, the reminding apparatus includes following modules.

A reminding module 101 may determine reminding time of the reminding apparatus and a reminding event corresponding to the reminding time, and trigger the reminding event when the reminding time is up.

A background running module 102 may indicate an operation system of the data processing device to trigger the reminding apparatus to enter a background running state after detecting a switch instruction.

A battery level checking module 103 may check the battery level of the data processing device when the reminding apparatus runs in the background.

When the battery level of the data processing device is lower than a predefined threshold, a battery level protecting module 104 may write a local notification into the operation system, set the triggering time of the local notification as the reminding time of the reminding apparatus, and trigger the reminding apparatus to enter a pending state. In this embodiment, the local notification can be triggered automatically by the operation system.

In an implementation, the background running module 102 may set the reminding apparatus in an application configuration file of the operation system as an application type that is allowed to run in the background by the operation system. Further, the background module 102 may trigger the reminding apparatus to perform operations corresponding to the application type set in the application configuration file when the operation system detects the switch instruction.

In an implementation, the battery level checking module 103 may check the battery level of the data processing device through invoking a circuit monitoring interface of the operation system.

Figure 2:
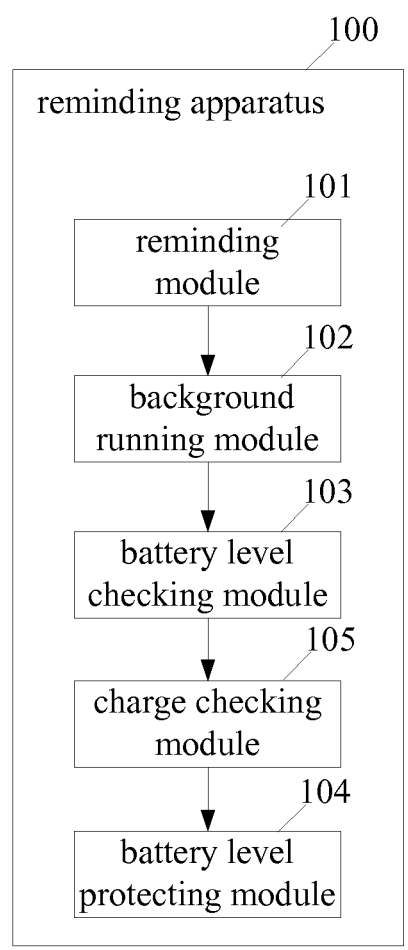
FIG. 2 is a diagram illustrating the structure of a reminding apparatus in a data processing device according to another embodiment of the present disclosure.

FIG. 2 is a diagram illustrating the structure of a reminding apparatus in a data processing device according to another embodiment of the present disclosure. Referring to FIG. 2, the reminding apparatus 100 further includes a charge checking module 105.

When the battery level of the data processing device is lower than the predefined threshold, the charge checking module 105 may check whether the data processing device is in a charging state.

When the data processing device is in the charging state, the battery level protecting module 104 may keep the background running state of the reminding apparatus. When the data processing device is not in the charging state, the battery level protecting module 104 may write the local notification into the operation system, set the triggering time of the local notification as the reminding time of the reminding apparatus, and trigger the reminding apparatus to enter a pending state. In this embodiment, the local notification can be triggered automatically by the operation system.

The local notification can be performed by the operation system. The operation system provides a write interface through which the local notification may be written. The reminding apparatus may invoke the write interface to write the local notification into the operation system. The local notification includes a triggering time field, a reminding content field and an executable file field. When writing the local notification into the operation system, the battery level protecting module 104 may write the reminding time of the reminding apparatus into the triggering time field. The operation system may automatically trigger the local notification at the triggering time. In this way, even if the reminding apparatus is pended, the reminding function may be implemented.

The battery level protecting module 104 may write self-defined reminding contents such as "reminding time is up" into the reminding content field of the local notification. Accordingly, the reminding contents displayed when the local notification is triggered may be set as the reminding contents self-defined by the reminding apparatus. In this situation, the reminding contents such as "reminding time is up" are displayed when the operation system triggers the local notification.

The battery level protecting module 104 may write an identification of an inner file of the reminding apparatus into the executable file field of the local notification. For example, the reminding apparatus may encapsulate multiple audio files. The name of one of the audio files may be written into the executable file field. In this way, a file executed when the local notification is triggered is set as an inner file of the reminding apparatus. Moreover, when the reminding apparatus writes the local notification into the operation system, the operation system automatically store a relationship between the local notification and the reminding apparatus, that is, the local notification is bundled with the reminding apparatus. When triggering the local notification, the operation system searches for the name of the audio file in the executable file field of the reminding apparatus (that is, an APP) bundled with the local notification, and automatically execute the audio file after finding the name of the audio file. In this way, the audio file encapsulated by the reminding apparatus may be played when the local notification is triggered.

The battery level protecting module 104 may write an identification of a designated interface (for example, an alarm clock interface or a main interface) of the reminding apparatus into the local notification. After the local notification is triggered and clicked by a user, the operation system automatically runs the reminding apparatus bundled with the local notification, and displays the designated interface of the reminding apparatus according to the identification of the designated interface in the local notification. Accordingly, in an implementation, the battery level protecting module 104 may set an operation to be executed after the local notification is triggered and clicked as an operation of miming the reminding apparatus and displaying the designated interface of the reminding apparatus.

The reminding module 101 may further trigger the reminding event corresponding to the reminding time of the reminding apparatus after the reminding apparatus is run. For example, for a reminding apparatus similar to an alarm clock, the reminding event may be an event of playing music in the data processing device. The music is not encapsulated by the reminding apparatus, and thus a user may select individual music as an alarm. In an implementation, the reminding apparatus may play the individual music after the user clicks the local notification, thereby meeting the individual requirements of the user.

Figure 3:
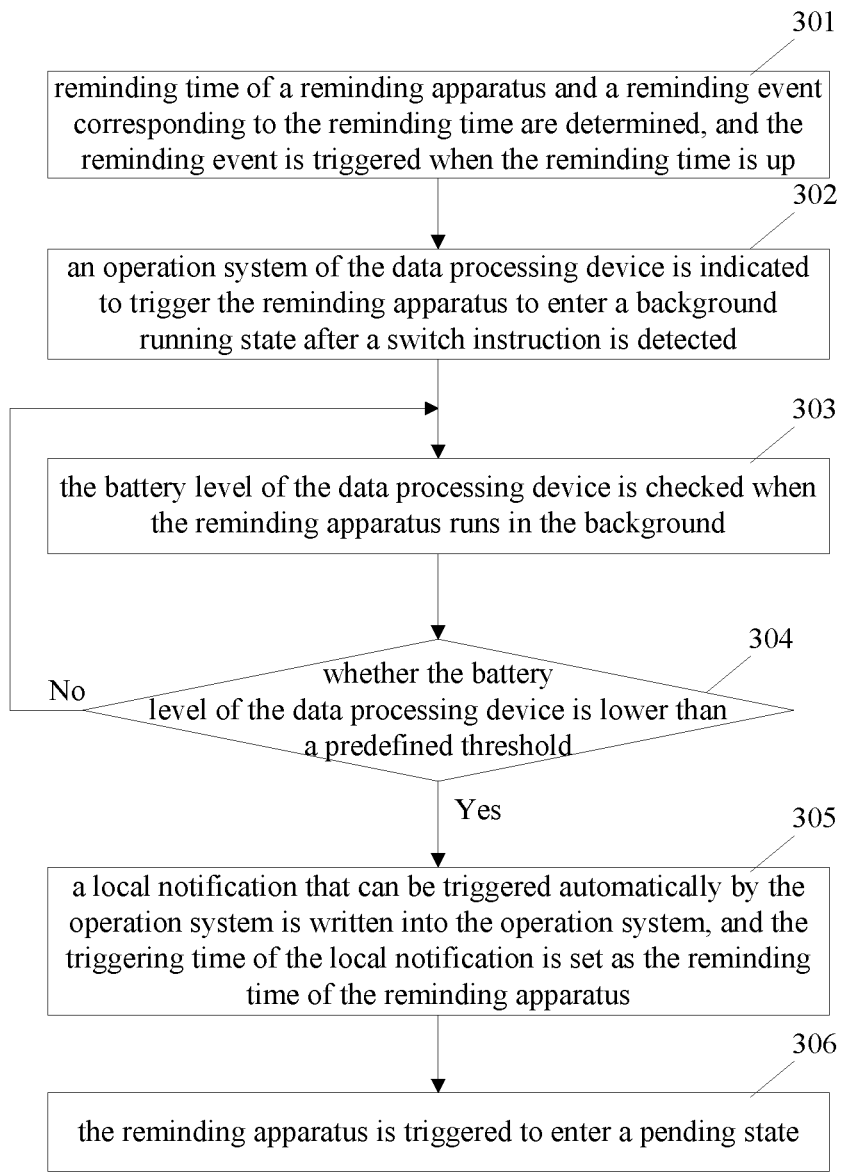
FIG. 3 is a flowchart illustrating a reminding method of a reminding apparatus in a data processing device according to an embodiment of the present disclosure.

FIG. 3 is a flowchart illustrating a reminding method of a reminding apparatus in a data processing device according to an embodiment of the present disclosure. The method includes following blocks.

At block 301, reminding time of a reminding apparatus and a reminding event corresponding to the reminding time are determined, and the reminding event is triggered when the reminding time is up.

In this block, the reminding time and the reminding event corresponding to the reminding time may be set by a user, or calculated by the reminding apparatus according to its logic. For example, the reminding time of an alarm clock and music to be played at the reminding time are set.

At block 302, an operation system of the data processing device is indicated to trigger the reminding apparatus to enter a background running state after a switch instruction is detected.

In an application configuration file of the operation system, the reminding apparatus is set as an application type that is allowed to run in the background by the operation system. For example, the reminding apparatus may be set as an APP for playing music, an APP for performing a LBS or an APP for performing a conversation in the iOS operation system. The process of setting the application configuration file may be performed before block 301. The operation system triggers the reminding apparatus to enter the background running state after detecting the switch instruction. At this time, the reminding apparatus still continues to perform operations corresponding to the application type set in the application configuration file, for example, the APP for playing music needs to play music continuously, the APP for performing a LBS needs to perform location processing continuously, and the APP for performing a conversation needs to keep a conversation. When performing the operations corresponding to the application type set in the application configuration file, the reminding apparatus may further indicate the operation system to allow performing more than one application having the same application type with the reminding apparatus. In this way, even if other APPs perform the application similar to the reminding apparatus, the operation system does not pend the reminding apparatus.

At block 303, the battery level of the data processing device is checked when the reminding apparatus runs in the background.

At block 304, it is determined whether the battery level of the data processing device is lower than a predefined threshold. If the battery level of the data processing device is lower than the predefined threshold, block 305 is performed; otherwise, the background running state of the reminding apparatus is kept and block 303 is performed.

At block 305, a local notification that can be triggered automatically by the operation system is written into the operation system, and the triggering time of the local notification is set as the reminding time of the reminding apparatus.

At block 306, the reminding apparatus is triggered to enter a pending state.

Figure 4:
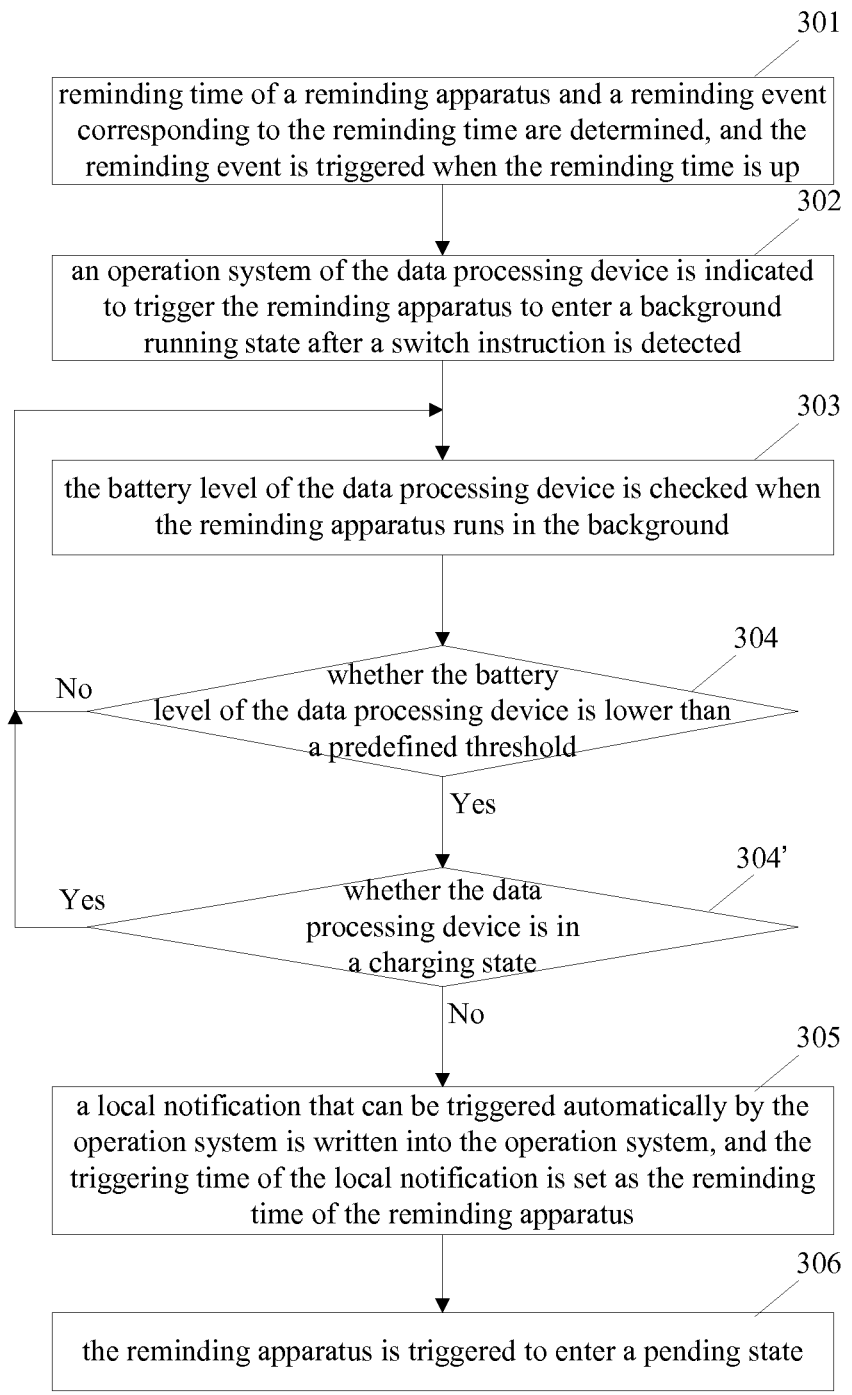
FIG. 4 is a flowchart illustrating a reminding method of a reminding apparatus in a data processing device according to another embodiment of the present disclosure.

FIG. 4 is a flowchart illustrating a reminding method of a reminding apparatus in a data processing device according to another embodiment of the present disclosure. The difference between the method shown in FIG. 4 and the method shown in FIG. 3 lies in that, after it is determined that the battery level of the data processing device is lower than the predefined threshold at block 304, the method shown in FIG. 4 further includes a following block.

At block 304', it is checked whether the data processing device is in a charging state. If the data processing device is in the charging state, the background running state of the reminding apparatus is kept, and block 303 is performed. If the data processing device is not in the charging state, blocks 305 and 306 are performed. That is, the local notification that can be triggered automatically by the operation system is written into the operation system, the triggering time of the local notification is set as the reminding time of the reminding apparatus, and the reminding apparatus is triggered to enter the pending state.

When the local notification that can be triggered automatically by the operation system is written into the operation system, the method further includes:

setting a file executed when the local notification is triggered as an inner file of the reminding apparatus. In this way, the operation system may execute the inner file of the reminding apparatus after triggering the local notification.

And/or, the method further includes: setting reminding contents displayed when the local notification is triggered as reminding contents self-defined by the reminding apparatus. In this way, the operation system may display the self-defined reminding contents after triggering the local notification.

And/or, the method further includes: setting an operation performed after the local notification is triggered and clicked as an operation of running the reminding apparatus and displaying a designated interface of the reminding apparatus. In this way, if a user clicks the local notification after the operation system triggers the local notification, the operation system may directly run the reminding apparatus and displays the designated interface. Further, after the local notification is triggered and clicked, the method further includes triggering the reminding event corresponding to the reminding time of the reminding apparatus.

The solution of the present disclosure is further illustrated hereinafter with reference to an embodiment.

In this embodiment, it is supposed that the data processing device is a mobile phone, the operation system is iOS operation system, and the reminding apparatus is an alarm clock APP for performing the reminding function of an alarm clock. The reminding time of the alarm clock APP and a reminding event corresponding to the reminding time may be set. The reminding event may be playing alarm or music. The alarm clock APP may enter a background running state, and play alarm or music at the designated time to implement an alarm clock function.

In this embodiment, it should be ensured that the alarm clock APP has a background running capability.

In the iOS operation system, each APP has an application configuration file named XXX-Info.plist. Correlated configuration items are added into the application configuration file to indicate the operation system that the APP may run in the background. FIG. 5 is a diagram illustrating an application configuration file of iOS operation system into which correlated parameters are added according to an embodiment of the present disclosure. Referring FIG. 5, a configuration parameter "Required background modes" is added into the application configuration file (named XXX-Info.plist) of the alarm clock APP, and an element "APP plays audio" is added, so as to indicate the operation system that the alarm clock APP is a music playing type. When playing music, the alarm clock APP may quit through pressing a "home" key. At this time, the alarm clock APP is not pended by the operation system, but enters a background running state. Of cause, an identification for indicating the APP to be the LBS type or another type that is allowed to run in the background by the iOS operation system may be added into the application configuration file, to indicate the iOS operation system to allow the APP to run in the background.

In order to keep the background running state, the alarm clock APP is necessary to perform operations in the background. For example, an audio file is played circularly. For example, an audio file named "quiet.caf" is played circularly through an AVAudioPlayer type in an AVFoundation database. This audio file is a quiet audio file, and thus normal operations of the user cannot be interfered when the alarm clock APP runs in the background.

When another application plays an audio file, the operation system usually stops playing the current audio file named "quiet.caf", thereby making the background running of the alarm clock APP terminate. Accordingly, when the audio file named "quiet.caf" is played circularly, it is necessary to set an AudioSession playing type as AVAudioSessionCategoryPlayback, and set a kAudioSessionProperty_OverrideCategoryMixWithOthers performance as "YES". After notifying the iOS operation system of the performance, the audio file named "quiet.caf" and an audio file of another application may be played at the same time. Accordingly, the iOS operation system does not pend the alarm clock APP when another APP plays an audio file.

In this embodiment, battery level protection measurement is necessary.

When a user uses the alarm clock APP, the user may set the reminding time of the alarm clock APP and the reminding event corresponding to the reminding time. For example, the reminding event set by the user may be playing an individual music file named aaa.mp3 stored in the mobile phone. When needing to switch to another interface, for example, a main interface, the user may press the "home" key to switch the foreground running state of the alarm clock APP to the background running state. In this case, the alarm clock APP plays an audio file continuously to keep the background running state. However, if the audio file is always played, the battery consumption of the data processing device will be high. Accordingly, it is possible that the data processing device is powered off because the battery is used up, but the user may be unaware of that the data processing device has been powered off. In this embodiment, the battery level protection measurement is necessary when the alarm clock APP runs in the background. At the same time, the reminding function of the alarm clock APP should be implemented.

In this embodiment, when running in the background, the alarm clock APP checks the battery level of the mobile phone every once in a while (for example, every 15 minutes). If the battery level of the mobile phone is lower than a predefined threshold (for example, lower than 15% of the battery level of the mobile phone) and the mobile phone is not charged, the alarm clock APP sends out a system notification, for example, displays "the battery level of the mobile phone is low, and the alarm clock APP will quit from the background running state".

A method for checking the battery level of the mobile phone and checking whether the mobile phone is in a charging state is implemented as follows. Each APP has a UIAPPlication object generated by the operation system. A batteryMonitoringEnabled performance of the UIAPPlication object of the alarm clock APP may be set as "YES", and thus the monitoring function of the iOS operation system may be started to monitor the battery level of the mobile phone. The iOS operation system also generates a UIDevice object, which represents the current mobile phone. A batteryState performance and batteryLevel performance of the UIDevice object may represent the charging state and battery level of the current mobile phone respectively. The alarm clock APP may create a timer named NSTimer, and read the batteryState performance and batteryLevel performance of the UIDevice object every 15 minutes, so as to determine whether the current mobile phone is in the charging state and determine the battery level of the mobile phone. If the mobile phone is not in the charging state and the battery level is lower than 15% of total battery level, the alarm clock APP invokes presentLocalNotificationNow of the UIAPPlication object to generate a system notification, for example, displays "the battery level of the mobile phone is low, and the alarm clock APP will quit from the background running state".

Afterwards, the alarm clock APP writes a local notification into the operation system through a scheduleLocalNotification interface of the UIApplication object, writes the reminding time of the alarm clock APP into the reminding time field of the local notification, writes the name (bbb.caf) of an audio file encapsulated by the alarm clock APP into the executable file field of the local notification, and writes self-defined contents (for example, "the reminding time is up") into the reminding contents field of the local notification, thereby handing the reminding function of the alarm clock APP over to the local notification of the operation system.

Afterwards, the alarm clock APP invokes a stop playing function of the AVAudioPlayer type, and stops playing the audio file named quiet.caf. The operation system automatically stops the background miming state of the alarm clock APP, thereby protecting the battery level of the mobile phone.

When the reminding time is up, the operation system automatically triggers the local notification written by the alarm clock APP. When the local notification is triggered, the reminding contents, for example, "the reminding time is up", are displayed, and the audio file named bbb.caf is played. In this way, not only the battery level is protected, but also the reminding function of the alarm clock APP is implemented, except that the individual alarm named aaa.mp3 set by the user is replaced with a ring named bbb.caf of the alarm clock APP.

When the user clicks the local notification, the operation system automatically runs the alarm clock APP bundled with the local notification, and switches the current interface to the designated interface of the alarm clock APP. At this time, the alarm clock APP may automatically play the individual alarm named aaa.mp3 set by the user, thereby facilitating the user to perform a subsequent operation for the alarm clock APP.

An embodiment of the present disclosure also provides a data processing device. The data processing device at least includes a storage medium and a processor communicating with the storage medium. The storage medium may store computer readable program codes, which can implement the functions of any of the above embodiments. The processor can read and execute the program codes stored in the storage medium.

The program codes read from the storage medium may implement the functions of any of the above embodiments. Accordingly, the program codes and the storage medium storing the program codes are parts of the solution of the present disclosure.

The storage medium may include reminding instructions, background running instructions, battery level checking instructions and battery level protecting instructions.

The reminding instructions may determine reminding time of the reminding apparatus and a reminding event corresponding to the reminding time, and trigger the reminding event when the reminding time is up.

The background running instructions may indicate an operation system of the data processing device to trigger the reminding apparatus to enter a background running state after detecting a switch instruction.

The battery level checking instructions may check the battery level of the data processing device when the reminding apparatus runs in the background.

The battery level protecting instructions may write a local notification into an operation system when the battery level of the data processing device is lower than a predefined threshold, set the triggering time of the local notification as the reminding time of the reminding apparatus, and trigger the reminding apparatus to enter a pending state. In this embodiment, the local notification can be triggered automatically by the operation system.

The storage medium further includes charge checking instructions. The charge checking instructions may check whether the data processing device is in a charging state when the battery level of the data processing device is lower than the predefined threshold.

The battery level protecting instructions may write the local notification into the operation system when the data processing device is not in the charging state, set the triggering time of the local notification as the reminding time of the reminding apparatus, and trigger the reminding apparatus to enter a pending state. In this embodiment, the local notification can be triggered automatically by the operation system.

When the local notification that can be triggered automatically by the operation system is written into the operation system, the battery level protecting instructions may further set a file executed when the local notification is triggered as an inner file of the reminding apparatus, and/or set reminding contents displayed when the local notification is triggered as reminding contents self-defined by the reminding apparatus, and/or set an operation performed after the local notification is triggered and clicked as an operation of running the reminding apparatus and displaying a designated interface of the reminding apparatus.

When the local notification that can be triggered automatically by the operation system is written into the operation system, the battery level protecting instructions may further set an operation performed after the local notification is triggered and clicked as an operation of running the reminding apparatus and displaying the designated interface of the reminding apparatus.

The reminding instructions may further trigger the reminding event corresponding to the reminding time of the reminding apparatus after the reminding apparatus is run.

The background running instructions may set the reminding apparatus in an application configuration file of the operation system as an application type that is allowed to run in the background by the operation system, and trigger the reminding apparatus to perform an operation corresponding to the application type set in the application configuration file after the operation system detects a switch instruction.

The foregoing is only preferred examples of the present invention and is not used to limit the protection scope of the present invention. Any modification, equivalent substitution and improvement without departing from the spirit and principle of the present invention are within the protection scope of the present invention.

What is claimed is:

1. A reminding apparatus in a data processing device, comprising:
    a reminding module, configured to determine reminding time of the reminding apparatus and a reminding event corresponding to the reminding time, and trigger the reminding event when the reminding time is up;
    a background running module, configured to indicate an operation system of the data processing device to trigger the reminding apparatus to enter a background running state after detecting a switch instruction;
    a battery level checking module, configured to check battery level of the data processing device when the reminding apparatus runs in the background; and
    a battery level protecting module, configured to write a local notification into the operation system when the battery level of the data processing device is lower than a predefined threshold, set triggering time of the local notification as the reminding time of the reminding apparatus, and trigger the reminding apparatus to enter a pending state, wherein the local notification can be triggered automatically by the operation system at the triggering time after the reminding apparatus enters the pending state;
    wherein the battery level protecting module is further configured to do at least one of the following processes:
    setting the triggering time of the local notification as the reminding time of the reminding apparatus through writing the reminding time of the reminding apparatus into a triggering time field of the local notification,
    setting a file executed when the local notification is triggered as an inner file of the reminding apparatus through writing an identification of the inner file of the reminding apparatus into an executable file field of the local notification,
    setting reminding contents displayed when the local notification is triggered as reminding contents self-defined by the reminding apparatus through writing the self-defined reminding contents into a reminding content field of the local notification, or
    setting an operation performed after the local notification is triggered and clicked as an operation of running the reminding apparatus and displaying a designated interface of the reminding apparatus through writing an identification of a designated interface of the reminding apparatus into the local notification.

2. The reminding apparatus of claim 1, further comprising a charge checking module, configured to check whether the data processing device is in a charging state when the battery level of the data processing device is lower than the predefined threshold; and
    the battery level protecting module is configured to write the local notification into the operation system when the data processing device is not in the charging state, set the triggering time of the local notification as the reminding time of the reminding apparatus, and trigger the reminding apparatus to enter the pending state.

3. The reminding apparatus of claim 2, wherein the battery level protecting module is further configured to set an operation performed after the local notification is triggered and clicked as an operation of running the reminding apparatus and displaying a designated interface of the reminding apparatus when writing the local notification into the operation system; and
    the reminding module is further configured to trigger the reminding event corresponding to the reminding time of the reminding apparatus after the reminding apparatus is run.

4. The reminding apparatus of claim 1, wherein the battery level protecting module is further configured to set an operation performed after the local notification is triggered and clicked as an operation of running the reminding apparatus and displaying a designated interface of the reminding apparatus when writing the local notification into the operation system; and
    the reminding module is further configured to trigger the reminding event corresponding to the reminding time of the reminding apparatus after the reminding apparatus is run.

5. The reminding apparatus of claim 1, wherein the background running module is configured to set the reminding apparatus in an application configuration file of the operation system as an application type that is allowed to run in the background by the operation system; and trigger the reminding apparatus to perform an operation corresponding to the application type set in the application configuration file after the operation system detects a switch instruction.

6. The reminding apparatus of claim 1, wherein the battery level protecting module is further configured to write a name of an audio file into an executable file of the reminding apparatus; and
    the operation system is configured to automatically store a relationship between the local notification and the reminding apparatus when the battery level protecting module writes the local notification into the operation system, search for the name of the audio file in the executable file field of the reminding apparatus when triggering the local notification, and automatically execute the audio file after finding the name of the audio file.

7. A reminding method of a reminding apparatus in a data processing device, comprising:
    determining reminding time of the reminding apparatus and a reminding event corresponding to the reminding time, and triggering the reminding event when the reminding time is up;
    indicating an operation system of the data processing device to trigger the reminding apparatus to enter a background running state after detecting a switch instruction;
    checking battery level of the data processing device when the reminding apparatus runs in the background; and
    writing a local notification into the operation system when the battery level of the data processing device is lower than a predefined threshold, setting triggering time of the local notification as the reminding time of the reminding apparatus, and triggering the reminding apparatus to enter a pending state, wherein the local notification can be triggered automatically by the operation system at the triggering time after the reminding apparatus enters the pending state;
    when writing the local notification into the operation system, the method further comprises at least one of:
    setting the triggering time of the local notification as the reminding time of the reminding apparatus through writing the reminding time of the reminding apparatus into a triggering time field of the local notification, setting a file executed when the local notification is triggered as an inner file of the reminding apparatus through writing an identification of the inner file of the reminding apparatus into an executable file field of the local notification, setting reminding contents displayed when the local notification is triggered as reminding contents self-defined by the reminding apparatus through writing the self-defined reminding contents into a reminding content field of the local notification, or setting an operation performed after the local notification is triggered and clicked as an operation of running the reminding apparatus and displaying a designated interface of the reminding apparatus through writing an identification of a designated interface of the reminding apparatus into the local notification.

8. The reminding method of claim 7, when the battery level of the data processing device is lower than the predefined threshold, further comprising:

checking whether the data processing device is in a charging state; and the writing the local notification into the operation system when the battery level of the data processing device is lower than the predefined threshold, setting the triggering time of the local notification as the reminding time of the reminding apparatus, and triggering the reminding apparatus to enter the pending state comprises:

writing the local notification into the operation system when the data processing device is not in the charging state, setting the triggering time of the local notification as the reminding time of the reminding apparatus, and triggering the reminding apparatus to enter a pending state.

9. The reminding method of claim 8, when writing the local notification into the operation system, further comprising:

setting an operation executed after the local notification is triggered and clicked as an operation of running the reminding apparatus and displaying a designated interface of the reminding apparatus; and triggering the reminding event corresponding to the reminding time of the reminding apparatus after the reminding apparatus is run.

10. The reminding method of claim 7, when writing the local notification into the operation system, further comprising:

setting an operation executed after the local notification is triggered and clicked as an operation of running the reminding apparatus and displaying a designated interface of the reminding apparatus; and triggering the reminding event corresponding to the reminding time of the reminding apparatus after the reminding apparatus is run.

11. The reminding method of claim 7, wherein the indicating the operation system of the data processing device to trigger the reminding apparatus to enter the background running state after detecting the switch instruction comprising:

setting the reminding apparatus in an application configuration file of the operation system as an application type that is allowed to run in the background by the operation system; and triggering the reminding apparatus to perform an operation corresponding to the application type set in the application configuration file after the operation system detects a switch instruction.

12. The reminding method of claim 11, when the reminding apparatus performs the operation corresponding to the application type set in the application configuration file, further comprising:

indicating the operation system to allow performing more than one application having the same application type with the reminding apparatus.

13. The reminding method of claim 7, further comprising:

writing a name of an audio file into an executable file of the reminding apparatus;

the operation system automatically storing a relationship between the local notification and the reminding apparatus when writing the local notification into the operation system; and the operation system searching for the name of the audio file in the executable file field of the reminding apparatus when triggering the local notification, and automatically executing the audio file after finding the name of the audio file.

14. A non-transitory storage medium, comprising computer readable program codes, configured to perform following steps:

determining reminding time of the reminding apparatus and a reminding event corresponding to the reminding time, and triggering the reminding event when the reminding time is up;

indicating an operation system of the data processing device to trigger the reminding apparatus to enter a background running state after detecting a switch instruction;

checking battery level of the data processing device when the reminding apparatus runs in the background; and writing a local notification into the operation system when the battery level of the data processing device is lower than a predefined threshold, setting triggering time of the local notification as the reminding time of the reminding apparatus, and triggering the reminding apparatus to enter a pending state, wherein the local notification can be triggered automatically by the operation system at the triggering time after the reminding apparatus enters the pending state;

when writing the local notification into the operation system, the computer readable program codes are further configured to perform at least one of:

setting the triggering time of the local notification as the reminding time of the reminding apparatus through writing the reminding time of the reminding apparatus into a triggering time field of the local notification, setting a file executed when the local notification is triggered as an inner file of the reminding apparatus through writing an identification of the inner file of the reminding apparatus into an executable file field of the local notification, setting reminding contents displayed when the local notification is triggered as reminding contents self-defined by the reminding apparatus through writing the self-defined reminding contents into a reminding content field of the local notification, or setting an operation performed after the local notification is triggered and clicked as an operation of running the reminding apparatus and displaying a designated interface of the reminding apparatus through writing an identification of a designated interface of the reminding apparatus into the local notification.

* * * * *